United States Patent [19]

Monaghan

[11] Patent Number: 4,858,416
[45] Date of Patent: Aug. 22, 1989

[54] TENSIONLESS SEAL APPARATUS AND METHOD

[75] Inventor: Alfred C. Monaghan, Simpsonville, S.C.

[73] Assignee: Siempelkamp Corporation, Greenville, S.C.

[21] Appl. No.: 81,697

[22] Filed: Aug. 4, 1987
(Under 37 CFR 1.47)

[51] Int. Cl.$^4$ .............................................. B65B 63/02
[52] U.S. Cl. ........................................ 53/439; 53/389; 53/463; 53/528; 53/553
[58] Field of Search ................ 53/439, 436, 463, 553, 53/529, 530, 528, 389, 229, 231

[56] References Cited

U.S. PATENT DOCUMENTS

| Re. 27,977 | 4/1974 | Monaghan | 53/30 |
|---|---|---|---|
| 2,876,731 | 3/1959 | Lopez et al. | 118/44 |
| 2,931,148 | 4/1960 | Smith | 53/28 |
| 2,976,780 | 3/1961 | Lopez et al. | 93/36 |
| 2,987,314 | 6/1961 | Monaghan | 271/74 |
| 3,097,462 | 7/1963 | Langdon | 53/180 |
| 3,158,973 | 12/1964 | Monaghan | 53/66 |
| 3,226,839 | 1/1966 | Monaghan | 34/21 |
| 3,340,670 | 9/1967 | Anderson et al. | 53/30 |
| 3,357,151 | 12/1967 | Monaghan | 53/28 |
| 3,382,644 | 5/1968 | Vogt | 53/29 |
| 3,411,263 | 11/1968 | Smolderen | 53/553 X |
| 3,429,100 | 2/1969 | Zelnick et al. | 53/182 |
| 3,449,886 | 6/1969 | Connelly et al. | 53/22 |
| 3,465,489 | 9/1969 | Monaghan | 53/28 |
| 3,490,194 | 1/1970 | Monaghan | 53/28 |
| 3,540,187 | 11/1970 | Monaghan | 53/74 |
| 3,596,428 | 8/1971 | Young | 53/28 |
| 3,618,740 | 11/1971 | Tavern | 53/553 X |
| 3,774,835 | 11/1973 | Monaghan | 229/32 |
| 3,791,100 | 2/1974 | Monaghan | 53/74 |
| 3,791,101 | 2/1974 | Monaghan | 53/210 |
| 3,837,138 | 9/1974 | Terry | 53/24 |
| 3,842,570 | 10/1974 | Monaghan | 53/26 |
| 3,848,393 | 11/1974 | Monaghan | 53/22 |
| 3,882,655 | 5/1975 | Monaghan | 53/3 |
| 3,914,917 | 10/1975 | Young | 53/22 B |
| 3,928,941 | 12/1975 | Singer | 53/553 |
| 4,041,673 | 8/1977 | Brooke et al. | 53/39 |
| 4,041,677 | 8/1977 | Reid | 53/553 X |
| 4,152,880 | 5/1979 | Kolosov et al. | 53/553 |
| 4,313,288 | 2/1982 | Tassi et al. | 53/74 |
| 4,463,542 | 8/1984 | Greenawalt et al. | 53/479 |

FOREIGN PATENT DOCUMENTS 1604607  1/1972  Fed. Rep. of Germany .
1704148  1/1974  Fed. Rep. of Germany .

Primary Examiner—James F. Coan
Attorney, Agent, or Firm—Dority & Manning

[57] ABSTRACT

A packaging machine is provided for packaging bundles, optionally under compression, with tensionless cross-seals. One problem of conventional devices is that movable sealing bars tend to rupture film as it is pulled together around materials to be packaged, particularly if the materials are relatively high or heavy. Packaging products under compression is an additional challenge. In this instance, packages are generally fed substantially at a predetermined speed between upper and lower webs of film, which are then sealed at their sides. Compression of the products being packaged may be optionally practiced during such side seal formation, and later during cross seal formation. Subsequently, the products enclosed in the side-sealed web of films move into a cross seal area, optionally including a reciprocatable carriage, operation of which in effect causes the product being sealed to move backwards relative to seal bars forming a cross seal therefor. Such operation causes a reduction or elimination of tension in the films as the cross seal is created. Thereafter, the fully enclosed package is accelerated above its former predetermined speed so as to generally re-establish an original degree of longitudinal separation between products moving through the packaging machine.

48 Claims, 5 Drawing Sheets

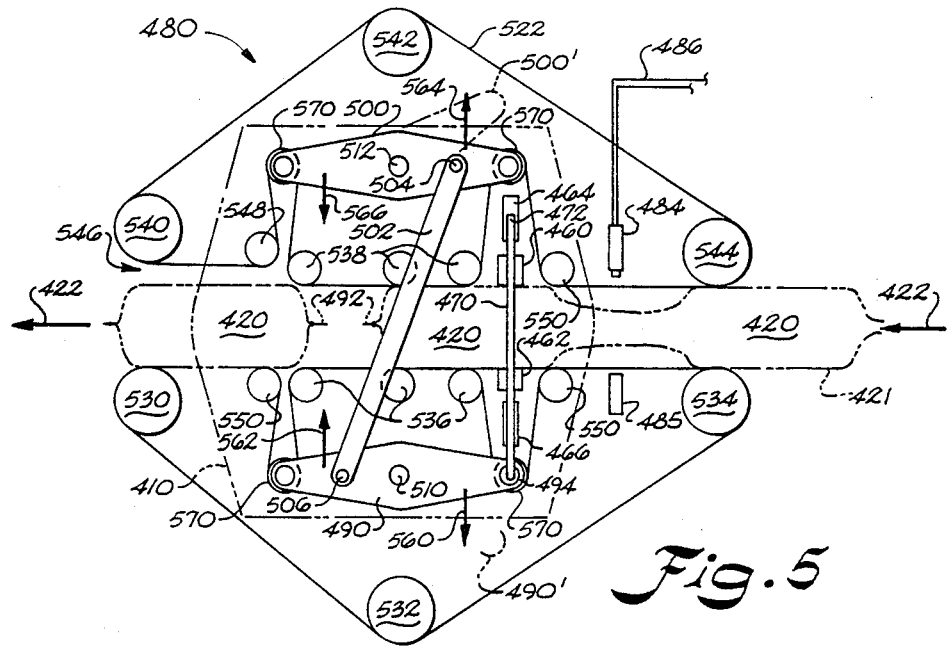
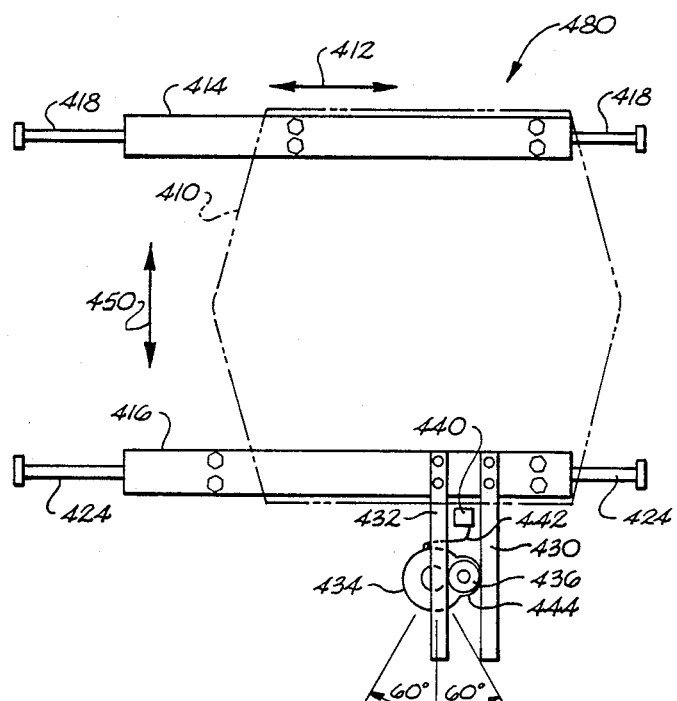
Fig. 5
Fig. 6

TENSIONLESS SEAL APPARATUS AND METHOD

BACKGROUND OF THE INVENTION

The present invention generally concerns a method and apparatus for packaging individual articles or products, and more particularly for packaging such items (or stacks thereof) in plastic-type wraps or films without any tension in such films.

In general, machines which utilize some form of continuous web of film for wrapping articles are well known. One category of such machines forms a tube from a continuous web of film, draws the film over a collar for actually forming such tube, and then provides an overlap seal at a desired joint. Products to be wrapped enter the tube continuously at spaced apart intervals. Since such machines utilize a collar-type assembly for forming the tube, or some type of folding frame work to achieve closure of a given package, such collar or frame work must be physically adjusted or interchanged with another before the machine can be used for making different sized packages, or even handling different size products.

A number of U.S. patents have issued concerning various packaging processes and devices, with the following list being only a brief representative list of same to serve as additional background information for the reader:

| U.S. Pat. No. | INVENTOR(S) | DATE OF ISSUE |
| --- | --- | --- |
| 4,463,542 | Greenawalt et al. | August, 1984 |
| 4,152,880 | Kolosov et al. | May, 1979 |
| 4,041,673 | Brooke et al. | August, 1977 |
| 3,914,917 | Young | October, 1975 |
| 3,596,428 | Young | August, 1971 |
| 3,382,644 | Vogt | May, 1968 |
| 3,097,462 | Langdon | July, 1963 |

In addition to the above-described tube-type formation, it is known to encase individual products between separate upper and lower webs of film, which films are subsequently sealed together in various manners so as to form a finished package. U.S. Pat. No. 2,931,148 issued to A. M. Smith on Apr. 5, 1960 is an example of one such device using thermoplastic materials such as polyethylene films, which are subsequently heat sealed.

One problem when sealing products between a pair of films is that the sealing mechanism (often including some type of moveable bar) may rupture the films during sealing, or induce undesirable tension therein resulting in later damage or failure. Also, joining a plurality of separate webs of film often results in a finished package having unsightly or undesirable seal joints. Even the tube-type approach referred to above can result in a final package having an overlap seal on the top or bottom of the package.

Not only are poor seal formations aesthetically unappealing from a marketing standpoint, but many applications require the ability to legibly print on the resulting packaged product. For example, phonograph records, games, models, or the like would in general be undesirably packaged if it were impossible to legibly print on the finished package, or if printed subject matter on the products themselves were obscured by folded over layers of plastic wrap. Other types of less structured (i.e. less stiff) products, such as towels, pads, or the like do not provide sufficient stiffness to be fed into a collar of the collar-type machines, or are otherwise not suitable for reliable handling by conventional packaging machines.

Frequently, it is desireable while forming a package to also compress the enclosed products; however, many conventional packaging machines do not possess such a capability. For example, towels are one product which are preferably compressed at least for purposes of packaging and/or shipment. U.S. Pat. No. 3,837,138 issued to R. D. Terry on Sept. 24, 1974 discloses in general a method and apparatus for compressing a compressible material, such as a batt of insulation, while simultaneously packaging such product.

While the option of compressing products as they are being packaged is often desired, it is frequently even more desireable to provide a completed package formed with at least tensionless film. U.S. Pat. No. 4,313,288 issued to Tassi et al. on Feb. 2, 1982 generally discloses a reciprocating carriage member which is operative in association with an upper sheet pay-off drum so that a web of wrapping material is suitably drawn off of a storage roll, whereby articles of different tallnesses may be sealed without undue sheet tension.

SUMMARY OF THE INVENTION

The present invention generally concerns a method and apparatus for the improved formation of a package around a product with tensionless film. Further in accordance with the present invention, compression may be optionally applied to products as they are packaged. As a result of this invention, tensionless seals may be obtained (with or without the application of compression) for a great variety of products, including those which are conventionally thought to be relatively high or heavy.

In accordance with a particular film tension reducing feature of the present invention, a product being advanced through a packaging machine is urged back towards a cross-sealer mechanism it just passed so that a web or webs of wrapping films may be suitable drawn around the product and sealed without inducing any tension therein. Thus, sufficient slack is created in the film (or films) to be sealed behind the ends of the product without any tension in the films. Such improved sealing feature preferably includes use of a reciprocating carriage in a cross seal area of a packaging machine, use of which makes possible relatively continuous machine operation. Hence, it is one of the present objects to in general to provide a packaging machine for continuous operation producing tensionless film packages, even at very high rates of production, eg. up to 200 units per minute.

It is another of the general objects of this invention to provide an improved method and apparatus for packaging products, particularly products packaged in tensionless films, so that such films are not damaged or weakened during package formation. It is another object of this invention to optionally provide for compression of products being so packaged with tensionless films. It is a still further object of this invention to provide packages having tensionless films, whether with or without compression, for even relatively thick or relatively heavy products.

It is yet a more particular object of this invention to provide a method and apparatus for improved side sealing of packages, further including substantially continuous formation thereof.

Still another object of this invention is to provide a method and apparatus for packaging products, having varied and simple adjustments to permit use thereof for different sizes and weights of packages, different degrees of compression thereof, different types of films, different product lengths, different rates of packaging production, and so forth.

It is also an object of this invention to provide packages which subsequently may be easily re-opened, but yet which are suitable for legible printing on all major surfaces thereof.

Numerous variations and modifications to the present invention, including substitution of equivalent structures or means, and reversal of various parts, elements, or features thereof, will be envisioned by those of ordinary skill in the art. All such variations are intended to come within the scope and spirit of the invention by virtue of present reference thereto.

However, particularly for purposes of present full and enabling disclosure, several specific exemplary embodiments in accordance with this invention are set forth in detail herein. Various combinations of presently disclosed features may be provided as an embodiment in accordance with this invention. For example, one such exemplary embodiment concerns an apparatus for packaging articles in relatively tensionless plastic films, comprising: first conveyor means for advancing longitudinally spaced-apart articles, to be separately packaged, in a defined forward direction at a predetermined speed; upper and lower plastic film supply means for feeding film respectively above and below such articles so that as they are advanced the articles become sandwiched between such films; article detection means, disposed relative to such first conveyor means, for outputting a detection signal responsive to the passage of articles thereby; carriage means, disposed downstream of such first conveyor means and having second conveyor means generally for continuing advancement of the articles in the forward direction; sealing means, responsive to the detection signal for laterally sealing the upper and lower films between adjacent articles being separately packaged; and film tension reducing means, responsive to said detection signal for urging articles within said carriage means relatively against said forward direction of said articles back towards the sealing means during its operation, thereby removing tension on the upper and lower films as same are sealed about such articles.

Yet another example of a machine constructed in accordance with the present teachings includes a machine for packaging compressed products in plastic film without inducing tension in the film of the finished package, such machine comprising: upper and lower compression belts for advancing a train of products at a given speed and under compression; upper and lower continuous webs of plastic film fed relative to such belts so that the products are sandwiched therebetween; means for determining the position of advancing products; a carriage, disposed longitudinally movable relative to the belts, for reciprocating, first in an advancing and then a reversing direction, responsive to indication of the trailing edge of an advancing product entering the carriage; a pair of generally opposing seal bars, disposed on the carriage and downstream from the product detection means, for controllably closing and forming cross-seals in the films between adjacent products; and pivoting roller frames, mounted on the carriage and controllably pivoting during the reciprocating thereof so as to cause products within such carriage and still held under compression by the roller frames to be pushed back towards the seal bars during their closing, whereby tensionless seals are formed for products packaged under compression.

Still another device constructed in accordance with features of the present invention concerns a machine for packaging under compression and in tensionless plastic film even relatively heavy or thick products, conveyors for cooperatively transporting a train of products under compression in a defined forward direction at a predetermined speed; respective upper and lower plastic film feed rolls for supplying continuous webs of film which enclose the respective tops and bottoms of products transported by the compression conveyors; a pair of side sealer means, disposed along at least a portion of respective sides of the compression conveyors, for sealing the sides of the webs of film as they oppose one another outside side edges of the products; reciprocating carriage means, including pivotable roller frames with endless belts entrained therearound, for receiving side-sealed products being discharged from the compression conveyors and maintaining such products under compression while longitudinally controllably reciprocating relative the compression conveyors; product detection means for outputting a detection signal responsive to the trailing edge of advancing products entering the carriage means; cross-sealer means, mounted on such carriage means for movement therewith, responsive to the detection signal for closing together the respective upper and lower film webs about the product being packaged, and laterally sealing same along a direction perpendicular to the side seals thereof; and actuation means, mounted on the carriage means for movement therewith, responsive to the closing of the cross-sealer means for pivoting the roller frames so that the forward edges thereof are moved towards each other while the trailing edges thereof are moved away from each other, whereby normally advancing side-sealed products are drawn back against the cross-sealer means by the belts entrained around the frames, so as to remove tension from such film webs being closed and sealed about the products by operation of such cross-sealer means.

The present invention equally concerns a method for packaging articles in relatively tensionless plastic films, one exemplary method comprising the steps of: advancing a plurality of spaced-apart articles, to be separately packaged, in a defined forward direction at a predetermined speed; feeding plastic films respectively above and below the articles as they are advanced along such forward direction so that they become sandwiched between such films; providing sealing means, responsive to passage of articles thereby for drawing together and laterally sealing the pair of respective films, between adjacent articles to be packaged; and during operation of the sealing means, urging such articles relatively against said forward direction thereof back towards said sealing means, whereby tension is removed in the pair of films as same are drawn together and sealed about the articles.

Yet another exemplary method in accordance with features of the present invention concerns a method for packaging compressed articles in plastic film without inducing tension in the film of the finished package, comprising the steps of: providing upper and lower compression belts for advancing a train of products at a given speed and under compression; providing upper and lower continuous webs of plastic film; feeding the webs of film relative to the belts so that the products are sandwiched therebetween; providing a reciprocatable carriage disposed relatively downstream from the belts for receiving and handling the products therefrom substantially in series; providing a product detection device disposed adjacent to the entrance of such carriage; reciprocating such carriage first in an advancing direction at the given speed and then in a reversing direction, beginning such reciprocating responsive to the detection of the trailing edge of an advancing product entering the carriage; providing upper and lower seal bars disposed on the carriage for advancing movement therewith at the given speed, and disposed downstream from the product detection device; closing the seal bars to draw together and form lateral cross seals in the films between adjacent products, responsive to product detection by the device therefor; providing pivotable frame members mounted on the carriage; and controllably pivoting such frame members during reciprocating of the carriage so as to cause products within the carriage to be relatively pushed back towards such seal bars as they close, whereby tensionless seals may be formed for products under compression, even for relatively high or heavy products.

While several specific embodiments have been set forth with particularity, it should be understood that numerous alternative embodiments comprising various combinations of features of the invention disclosed herein may be provided in a given apparatus or method as an embodiment in accordance with the present invention.

BRIEF DESCRIPTION OF THE DRAWINGS

A full and enabling description of the present invention, including the best mode thereof, is set forth more particularly in the following specification, taken in conjunction with the accompanying drawings, in which:

FIG. 5 illustrates a schematic side view of one example of a reciprocatable carriage structure in accordance with the present invention, including various movable linkages thereof for actuation during a cross-sealing operation, as further described below;

FIG. 6 illustrates a schematic side view representation of the reciprocating motion possible with an exemplary carriage in accordance with this invention, including an actuating mechanism for such reciprocation, also occurring during such cross-sealing operation, as explained in detail below.

Figure 1:
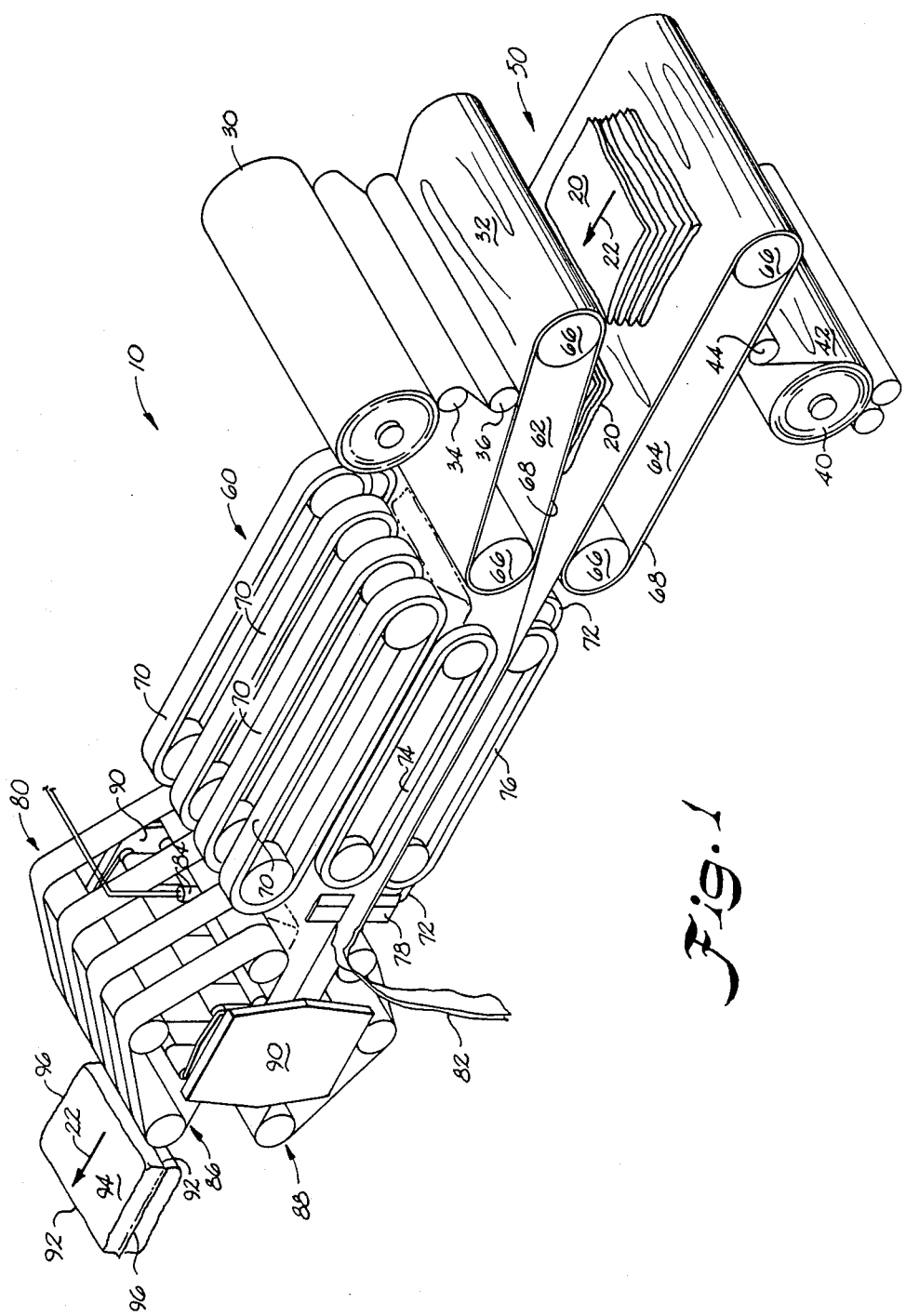
FIG. 1 illustrates an overall perspective schematic representation of a first embodiment in accordance with the present invention, including a feed-in compression feature, a side seal feature, and a generally schematic representation of a reciprocating carriage construction particularly useful for producing tensionless cross-seals.

Repeat use of reference characters throughout the present specification and accompanying drawings is intended to represent same or analogous features or elements of the present invention.

DESCRIPTION OF THE PREFERRED EMBODIMENTS

Referring to FIG. 1, an overall construction of a packaging apparatus 10 provided with a number of features in accordance with this invention is schematically illustrated in a perspective side view. For clarity, the outer casings, framework and the like of such packaging machine, including roller supports, drive motors, etc. (all generally understood by those of ordinary skill in the art) are not specifically illustrated in FIG. 1 so that the more particular, inner workings thereof may be viewed. While an apparatus in accordance with this invention may be adapted for packaging a great variety of products or items, in the present example a stack of towels 20 is fed into machine 10 in the direction of arrow 22. Respective upper and lower film feed rolls 30 and 40 provide upper and lower webs of wrapping film 32 and 42, respectively. Such films (generally thermoplastic materials of various selected strength, stretching, puncture, etc. characteristics) may be variously entrained about support rollers 34, 36, and 44 (as illustrated), and fed to an input area 50 of machine 10 for encasing products 20 fed thereto.

Film webs 32 and 42, and products 20 encased therebetween may be forwarded in the direction of arrow 22 towards a central area 60 of machine 10 where side sealing of webs 32 and 42 may take place. Side seals are marginal edge seals in films (outside of the products encased thereby) generally in the longitudinal direction of machine 10. Such seals are in general continuously formed along both sides of central section 60 (only one side illustrated) so that products emerge from such central section substantially enclosed in a relative tube of packaging film.

In accordance with the present invention, products 20 are optionally subjected to compression as they are fed from input 50 towards such center machine section 60. In one preferred exemplary embodiment, as represented by present FIG. 1, compressor conveyors 62 and 64 may be provided, each having respective rollers 66 and conveyor belt element 68. As understood by those of ordinary skill in the art upon viewing FIG. 1, such belts 68 are entrained about rollers 66, and positioned so as to have mutually decreasing distance therebetween as approaching central section 60, whereby stacks of products 20 fed therebetween become increasingly compressed while moving in the direction of arrow 22 from feed section 50 of the machine towards central section 60 thereof. Equivalent compressing constructions may be used in place of conveyors 62 and 64. Other non-compressing conveyor type mechanisms may be used in place of compressor conveyors 62 and 64 if no compression is desired. Furthermore, in general, input section 50 of machine 10 may use a plurality of adjacent segmented conveyor sections or their equivalents for accomplishing substantially the same function of conveyors 62 and 64 for consecutively forwarding products 20 from feed section 50 to central section 60 of machine 10, whether with or without compression applied thereto.

In general, whenever compression is applied in input section 50, central section 60 includes means for conveying products 20 under compression, while enclosed within upper and lower films 32 and 42. A mechanism for accomplishing side sealing of marginal portions of such films projecting beyond the outer edges of products 20 is also included within section 60. Thus, central section 60 may also be considered as a side sealer section of overall machine 10.

While various constructions may be practiced in accordance with the present invention, the exemplary embodiment of FIG. 1 utilizes a plurality of parallel conveyors 70 to both convey products 20 through central section 60 in the direction of arrow 22 and maintain compression of such products during such conveyance. It is understood that each of the compression conveyors 70 (generally illustrated as above products 20) has a corresponding conveyor section 72 located diametrically opposite same beneath product 20, whereby product 20 (as encased between films 32 and 42) is compressed and conveyed from both above and below. Also, such conveyors 70 and 72 collectively function to convey products 20 throughout the entire longitudinal distance of central section 60, generally from feed section 50 to entering a cross sealer section 80, preferably including a reciprocatable carriage as discussed in greater detail below (particularly with reference to FIGS. 4–6).

A side sealer function in accordance with this invention may be accomplished in a variety of manners in central section 60, any one of which may alternatively be practiced as part of an embodiment in accordance with this invention.

While various side sealer constructions may be practiced in accordance with the present invention, FIG. 1 illustrates one specific preferred embodiment thereof, wherein excellent seals are obtained by providing opposing upper and lower clamping belts 74 and 76 on each marginal side of products 20 as they pass between compression conveyors 70 and 72. In general, relatively molten film (which can develop during heat-assisted trimming or sealing of films) will adhere to clamping surfaces unless a non-stick material such as silicon rubber or fluorocarbon is used.

Whenever thermoplastic films are used in conjunction with side sealer clamping conveyors 74 and 76, directed hot air provided through a compressed air input can be sufficient for suitably sealing upper and lower film webs 32 and 42. In the particular embodiment of FIG. 1, a slitting blade 78 or equivalent trimming blade (with included heater element) may be provided on each marginal side of central section 60, each for both trimming selvedge 82 projecting from the marginal edges of webs 32 and 42, and sealing such trimmed marginal edges.

In general, the length of clamping conveyors 74 and 76 may be shorter than the longitudinal length of conveyors 70 and 72; however, variety may be practiced so long as the marginal edges to be trimmed are adequately held for proper presentation to trimming blades 78. The precise position of each blade 78 relative the clamping and compressor conveyors may be varied, but one preferred position includes a placement in the space defined between the corresponding paired conveyors, as more fully illustrated and discussed with reference to FIGS. 2, 3a, and 3b below.

As products 20 continue to be advanced in the direction of arrow 22, they emerge from central section 60 (i.e. beyond trimming blade 78) and are conveyed into a reciprocating carriage or cross seal area 80. A detector means 84 is positioned relative to such carriage assembly for detecting the entry of products 20 thereinto. At such point of detection, the products are compressed (if compression is being utilized), and have the side edges sealed of the films within which they are enclosed. In general, the purpose of the area 80 is to perform cross seal operations on the side sealed films enclosing products 20 so as to complete packaging of the products. A further purpose of the reciprocating carriage feature of area 80 is to permit continuous drive belt motion during the packaging process, even for packages being produced under compression, or for relatively high or heavy products.

Furthermore, it is an advantageous feature of the present invention that a film tension reducing means (in this instance a pivoting roller frame feature combined with a reciprocatable carriage) functions to reduce or eliminate tension in films 32 and 42 as the cross seals thereof are formed, as more particularly discussed with reference to FIGS. 5 and 6 below. Alternative embodiments, such as in present FIG. 7, may be practiced.

In general, such tensionless seals are obtained with the exemplary embodiment of FIG. 5 by manipulating pivoting roller frames 86 and 88 to controllably urge products within cross seal area 80 backwards against the direction of arrow 22 against a cross seal mechanism, more particularly illustrated and discussed with reference to FIGS. 4 and 5 below.

End plates 90 generally represent the framework of cross seal or carriage area 80, which may preferably be reciprocated during operation of machine 10. If reciprocation is alternatively not used, then it is normally required that overall drive of products through the machine must be stopped and re-started during the cross seal operation, as understood by those of ordinary skill in the art. In such instances, a carriage means of this invention need not be reciprocatable, but instead need essentially only provide structure for supporting rollers about which a conveyor means for a cross-seal area may be entrained.

In general, for reciprocating operation, carriage 80 or an equivalent structure therefor begins from an initial position, relatively adjacent to the exit area of central area 60, as illustrated substantially by present FIG. 1. Reciprocating motion takes place in the longitudinal plane of machine 10, first in the direction of arrow 22 (and generally at the predetermined speed with which the products are moved through the feed section 50 and central area 60 of machine 10), and then in a direction reverse to arrow 22 so that carriage 80 returns to its initial position as illustrated in FIG. 1.

The cross seals 92 formed on either longitudinal side of finished package 94 are generally perpendicular to the side seals 96 thereof. Only one of each of the side seals and cross seals may actually be seen in the illustration of FIG. 1, but the reference characters indicate the general position of the seals not seen in the Figure, as understood by those of ordinary skill in the art.

Furthermore, an additional trimming blade corresponding to that of 78 is diametrically opposed on an opposite side of central area 60 so that side seals 96 are formed on both marginal sides of the package being formed about products 20. Thus, the side seals may be simultaneously formed in accordance with the present invention, or the longitudinal position of trimming blade 78 and its corresponding mate may be displaced from one another so that the actual trimming and sealing functions thereof are not simultaneously formed for corresponding side seal portions of a package, but are both generally performed in a continuous fashion within central (or side seal) section 60. Since machine 10 generally provides continuous motion for products 20 being fed to the feed section 50 thereof and central area 60 thereof (as encased within upper film 32 and lower film 42), trimming blade 78 and its mate both continuously produce selvedge 82 and form side seals for the enclosing films 32 and 42.

In contrast, the pair of cross seals 92 formed for completed package 94 generally are not formed at the same time within carriage 80. A single cross seal mechanism, such as a pair of upper and lower seal bars disposed laterally across the width of the carriage 80 (i.e. perpendicular to the direction of arrow 22 longitudinally along machine 10) may be provided within carriage 80 for selectively forming a single cross seal at a time for package 94. In fact, the cross seal mechanism within carriage 80 normally forms cross seals between the longitudinal placement of adjacent stacks of products. Hence, two consecutive such cross seal operations form the leading edge and trailing edge cross seals for a finished product 94. As is understood by those of ordinary skill in the art, the trailing cross seal for one stack of products at the same time severs adjacent packages and forms the leading edge cross seal for the next subsequent stack of products.

To generally summarize the overview of FIG. 1, products 20 entering a feed section 50 of machine 10 may or may not be compressed, to a selective degree, as they are enclosed between upper and lower film webs 32 and 42, respectively. Continuing in the direction of arrow 22 (the longitudinal axis of machine 10), such products remain under compression within central (side seal) area 60, wherein effectively a continuous tube of film with products spaced within the tube are formed by operation of side sealer mechanisms located within central area 60. The products then enter a cross sealing area 80, where they are completely sealed and the individual packages severed from each other. The carriage in such cross seal area may optionally be reciprocated (for "continuous" feed of products through the machine) or not (for intermittent fed of products through the machine).

While numerous embodiments may be practiced in keeping with this invention, the cross sealing mechanism when used with a reciprocating carriage may be actuated for operation thereof by a mechanical cycling device such as a single revolution clutch (see FIG. 6), with such actuation being initiated by detection of a particular portion of a product (e.g. the trailing edge of a product passing underneath detector 84). Alternatively to actual product detection, reciprocation of a carriage and cross seal actuation can be equivalently accomplished based on a timing sequence or the like established in accordance with the overall predetermined speed with which products 20 are fed through machine 10, and the selected spacing therebetween. In either instance, a reciprocating carriage in accordance with this invention generally moves with the product during a cross sealing cycle at approximately the same velocity as such predetermined product speed. Numerous advantages flow from practice of such an apparatus and method, and equivalent variations thereof, as more fully discussed below.

Figure 2:
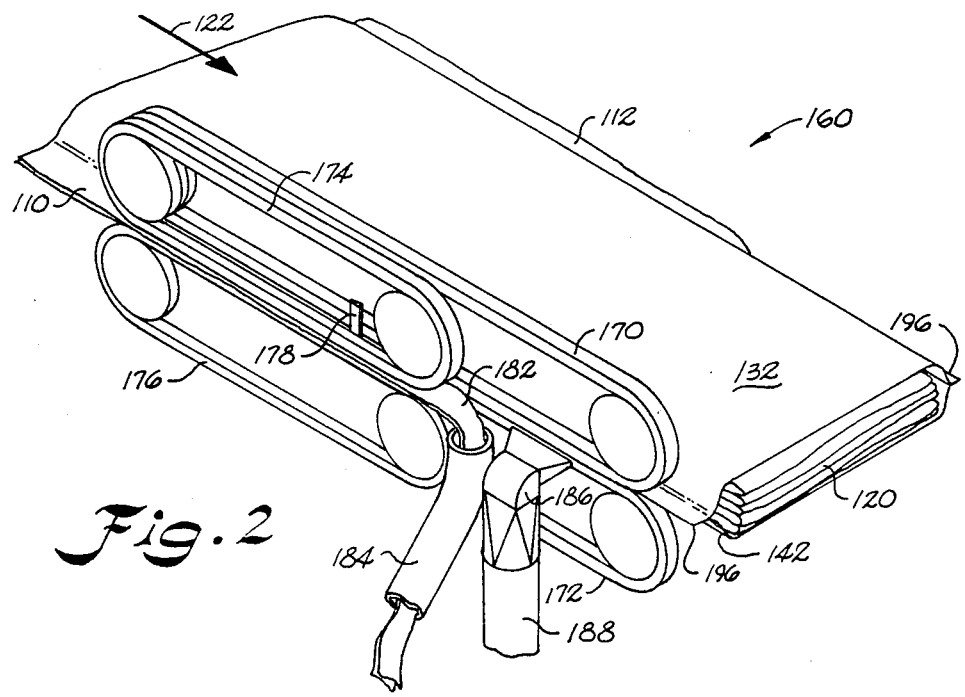
FIG. 2 illustrates alternative side seal features in accordance with the present invention.

Referring to FIG. 2, a second embodiment is illustrated of a side sealer section 160 for an exemplary machine in accordance with the present invention. For purposes of illustrating a side reverse to that of the machine illustrated in FIG. 10, it should be noted that FIG. 2 illustrates a forward direction of movement for products therein as generally left to right (see direction flow arrow 122).

In general, products 120 are enclosed between upper film 132 and lower film 142. While compression conveyors may optionally be used, they are not illustrated in every minor detail for the embodiment of FIG. 2. Upper and lower conveyors 170 and 172 are intended as generally representative of conveyors which may be used as compression (or even non-compression) conveyors, spaced across the width of section 160 (analogous to the position of conveyors 70 and 72 in present FIG. 1). However, for present purposes, conveyors 170 and 172 cooperate with shorter conveyors 174 and 176 to hold marginal edges of film webs 132 and 142 so that an optionally-heated trimming blade 178 mounted between such conveyors may trim away selvedge 182. As understood by those skilled in the art, though not illustrated, complementary conveyors and trimming mechanisms may be used on the opposite side of central side seal area 160 so that side seals 196 may be formed along both marginal sides of the package being formed.

Untrimmed and unsealed marginal areas 110 and 112 of film webs 132 and 142 are illustrated on both marginal sides of the advancing webs. Marginal portion 112 illustrated on the background side of FIG. 2 disappears in a generally downward direction, corresponding to the removal of selvedge 182 as illustrated on the foreground side of FIG. 2. A vacuum scrap removal device 184 or its functional equivalent may be utilized for removing trimmed selvedge 182, and the corresponding trimmed selvedge for marginal portion 112. One such equivalent could include a wind-up reel or similar device winding up trimmed film material for removal thereof.

While those of ordinary skill in the art will appreciate that a heated blade such as 178 will both trim and seal side seals 196, such seals can be greatly strengthened and produced generally in less time with the optional introduction of hot air. While great variety in practical embodiments may be practiced, FIG. 2 illustrates one example of a blower head 186 which may be used for directing hot air from a tube or hose 188 onto marginal edge 196 as it is still supported and advanced by conveyors 170 and 172.

If sufficiently hot air were used and the conveyors were selected of proper materials (i.e. so as to prevent adherence of melted materials thereto while also withstanding the application of heat), it may also be possible to altogether omit blade member 178. In such instance, marginal edges 110 and 112 of film webs 132 and 134 will bead back against the belt (for effective trimming of edges 110 and 112) and be cooled down (for effective sealing of films 132 and 142) as the product continues its forward travel in the direction of arrow 122. At higher production speeds (i.e. speed of products through a packaging machine), air cooling could be optionally introduced to minimize belt length, or to make possible even higher production speeds. It is generally preferred however that a trimming blade or its equivalent be used so that selvedge 182 may be readily drawn off in a continuous strip, as illustrated in present FIG. 2.

It should be appreciated that the various embodiments presently illustrated and disclosed for a side sealer mechanism each possess their own specific advantages, and that any one of the side sealers presently disclosed may be alternately practiced as part of an embodiment in accordance with this invention. For example, present FIG. 2, with blade 178 between adjacent conveyors 170 and 174, is particularly useful in situations where edges 110 of both film webs 132 and 142 may not be in complete alignment. Such apparatus and method is also particularly useful in applications where the product 120 being sealed is not flat, and thus more frequently resulting in non-aligned edges.

With respect to FIG. 2, it should be understood that for purposes of present illustration to isolate an exemplary machine side sealer section, advancing webs 132 and 142 and products 120 enclosed therein are illustrated as being cut off or terminated when emerging from central side sealer section 160. In practice, however, the tube of enclosed, longitudinally spaced-apart products is continuously formed by side sealer section 160 and forwarded to a cross sealer section of an overall machine. Thus, the advancing edges of enclosing films and products are normally not exposed as illustrated in present FIG. 2.

Figure 3A:
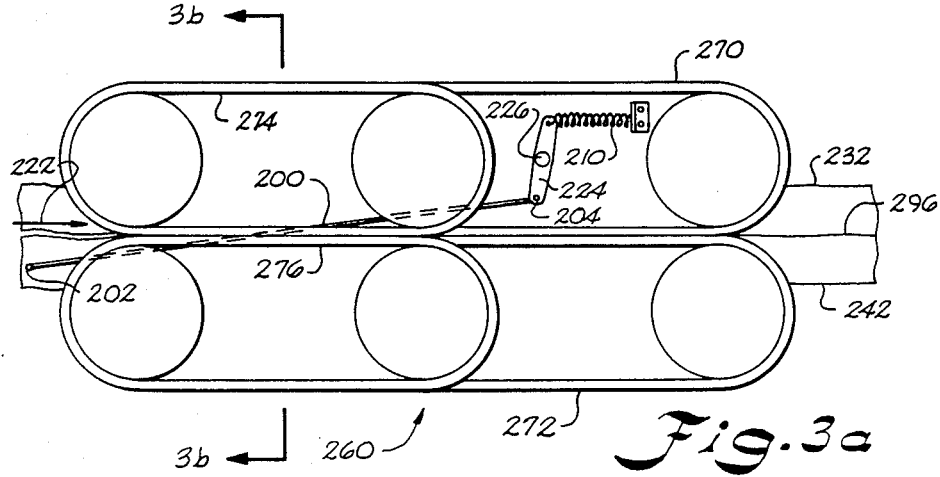
FIGS. 3a and 3b illustrate a side view and cross-sectional view, respectively, of still further side seal features in accordance with the present invention.
Figure 3B:
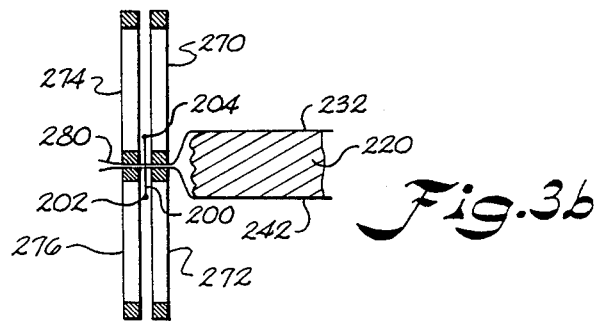

FIGS. 3a and 3b illustrate yet another embodiment of a side sealer section 260 in accordance with the present invention. In such embodiment, optionally heated knife 178 is generally replaced with a hot wire or resistance wire 200, which wire is suitably held under tension with a spring 210. Such spring is intended as exemplary embodiment of a device for tensioning wire 200. Alternatives may be practiced, particularly as necessitated by various conditions within a given machine. In this instance, a connecting element 224 is mounted on a pivot 226 and urged in a counter-clockwise direction by spring 210 (normally under compression). Thus, tension on resistance wire 200 is suitably maintained.

The remainder of the FIG. 3a embodiment is generally similar to that of present FIG. 2. A pair of more lengthy upper and lower conveyors 270 and 272 and shorter clamping conveyors 274 and 276 grasp the marginal edges of webs 232 and 242 advanced in the direction of arrow 222 for being trimmed and sealed by resistance wire 200 to form side seals 296. Supplemental hot air sealing and/or vacuum selvedge removal may optionally be practiced also, as generally indicated by FIG. 2.

FIG. 3b illustrates a cross-section of FIG. 3a along the lines indicated thereof, and more completely illustrates the trimming of marginal edge materials 280 from film webs 232 and 242. Products 220 are encased within films side sealed by resistance wire 200 stretching between support points 202 and 204 thereof. The longitudinal positioning of resistance wire 200 in a relatively upstream area of central side sealer area 260 allows room within such area 260 for the optional use of a trimmed-film removal mechanism for selvedge produced by the side seal trimming function (not illustrated in FIG. 3b) and the optional use of a hot air blower mechanism (also not illustrated in FIG. 3b).

While various alternative embodiments of the side seal feature of the present invention may be practiced, generally in most cases a side seal produced by a heated resistance wire or hot knife element is sufficient, without introduction of supplemental hot air. With such method and apparatus, it is also generally true that the reliability of the seal integrity improves the closer the film layers clamped together are to the heated wire or element. In other words, with reference to FIG. 3b, the less distance between conveyors on either side of resistance wire 200, the better the gripping of webs 232 and 242 in their respective marginal regions, and the better the resultant side seal.

Figure 4:
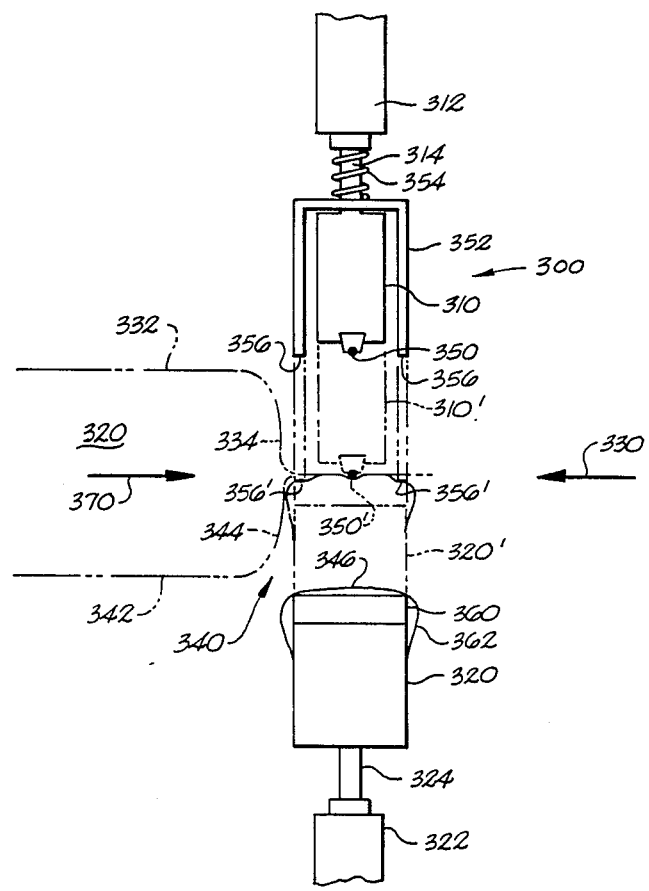
FIG. 4 illustrates a side view of one exemplary cross-sealer mechanism in accordance with the present invention, including open (solid line illustration) and closed (dotted line illustration) positions thereof.

FIG. 4 illustrates a side view of one example of an exemplary cross seal mechanism in accordance with the present invention, which may be supported on an optionally reciprocatable carriage, such as represented with machine 10 of FIG. 1. While various particular placements of such cross seal mechanism 300 may be practiced, it is generally preferred that same be placed near the entrance portion of cross seal section 80 so that a trailing edge cross seal is provided for products within the reciprocating carriage, while a leading edge cross seal is simultaneously formed for products which will next enter such carriage. Of course, the adjacent products are also severed from one another by the formation of such cross seal therebetween.

The illustrated preferred embodiment of cross seal mechanism 300 includes upper and lower seal bars 310 and 320, respectively. Such seal bars preferably extend the width of carriage 80 so as to establish cross seals all the way across upper film 332 and lower film 342 with a single operation. Various support and actuation schemes for holding seal bars 310 and 320 and bringing them together may be practiced, with hydraulic mechanisms 312 and 322 (e.g. such as air cylinders) being respectively illustrated for each of the seal bars. Pistons 314 and 324 of each respective seal bar actuation device reciprocate in a vertical plane of machine 10 so that the seal bars are controllably moved between the respective positions thereof illustrated in solid line (i.e. open), and the dotted line positions (i.e. closed) indicated by seal bars 310' and 320'.

In the solid line position, the seal bars are mutually retracted from one another so that a product 320 enclosed in upper and lower film webs 332 and 342 respectively (including side seals thereof, not illustrated) may pass between the open seal bars, preferably in a right to left movement as illustrated by arrow 330. A detector element such as 84 or the like of FIG. 1 (not shown in FIG. 4) may be utilized to determine whenever the trailing edge 340 of enclosed product 320 has entered carriage 80. At such time, reciprocating actuation of the carriage (as discussed more fully below with reference to FIGS. 5 and 6) and closure of seal bars 310 and 320 may begin.

It is preferred that each of seal bars 310 and 320 be vertically displaced in a closing motion so as to mutually meet substantially at a center line of product 320 (as illustrated). In such manner, trailing portions 334 and 344 of the upper and lower films may be drawn together for production of the cross seal therebetween. As described more fully below, trailing portions 334 and 344 have a certain amount of slack or looseness therein created just at the time of cross sealing so that tensionless seals result.

While the configuration of FIG. 4 is preferred, it is not essential that only upper seal bar 310 be provided with a hot wire element 350 extending therealong, and a receiving pad 360 mounted on lower seal bar 320. Such features could generally be reversed as to their seal bar placement without departing from the spirit and scope of the present invention. Pad 360 preferably comprises a silicon rubber pad having characteristics of both resilience and heat resistance so that the pad can receive pressure from the opposing seal bar, including the hot wire element 350 thereof. To further ensure protection of pad 360 and to prevent molten material from adhering to such pad, a teflon fiberglass tape 362 may be placed over the entire upper end of lower seal bar 320, including pad 360 thereof. Such teflon tape need not be very thick, with a thickness of about 0.005 inches being generally sufficient.

Uncontrollable extrusion of molten film, or tension on the film in the specific area of the cross seal as such seal is formed by hot wire 350 may be advantageously avoided with an additional feature of the present invention, wherein a jacket 352 is resiliently mounted about the seal bar which carries hot wire 350. The dimensions of the seal bar carrying hot wire 350 (in this exemplary embodiment being the upper seal bar 310) are such with relationship to the opposing seal bar that the outer edges of jacket 352 initially meet a contact surface 364 of seal bar 320 as the seal bars are closed together. Spring 354 is suitably mounted between a portion of actuation member 312 and an upper surface of jacket 352 so that the lower edges 356 of jacket 352 are ensured of initially engaging contact surface 364 of seal bar 320 ahead of hot wire 350 as the seal bars are brought together. Thereafter, spring 354 begins to be compressed as seal bar 310 continues to close towards contact surface 364 of lower seal bar 320. Such function permits the lower edges 356 of jacket 352 to hold films 332 and 342 in place on contact surface 364, and remove any tension therefrom.

Ultimately, spring 354 is sufficiently compressed that hot wire 350 descends to press films 332 and 342 against teflon contact surface 364, as illustrated by dotted line position 350' of present FIG. 4. At such time, opposing edges 356' of jacket 352 hold films 332 and 342 in place for cross sealing without any tension therein. Tension in such films is further reduced or eliminated outside jacket 352 as described below.

As more fully discussed below with reference to FIGS. 5 and 6, tension in films 332 and 342 is further reduced or eliminated by particular manipulation of products 320 within cross seal area 80. Specifically, products 320 are initially forwarded into area 80 in the direction of arrow 330 (FIG. 4). After such initial entry, and normally after a detection signal is obtained from a detection member such as 84 of FIG. 1, when reciprocation is optionally used the entire carriage assembly (including cross seal mechanism 300 mounted thereon) is reciprocated beginning with movement in the direction of arrow 330 and generally at the same predetermined speed with which products 320 formerly moved through machine 10.

As such reciprocation takes place (with cross seal mechanism 300 having a defined forward velocity generally the same as the previous predetermined speed of product 320), product 320 is decelerated from such predetermined speed, which effectively causes product 320 to be urged backwards (against the defined forward direction of products in the apparatus) in the direction of arrow 370 (FIG. 4) towards seal bars 310 and 320 as such seal bars close. The result of such effective reverse thrust is that slack or looseness is produced in the back marginal portions 334 and 344 of the films so that such portions may be mutually drawn to a central position of products 320 by closure of seal bars 310 and 320 without establishing any tension in such films. Therefore, a greatly improved cross seal results, without any tension in the films, and without requiring a break (i.e. stop-/start operation) in the generally continuous flow of products through a packaging machine constructed and operated in accordance with the present invention (when optionally using a reciprocatable carriage).

In general, after the seal bars begin to open and the cross seals are sufficiently formed, products 320 are again accelerated in the direction of arrow 330 (i.e. away from cross seal mechanism 300) at a speed generally greater than said former predetermined speed to make up for the loss of longitudinal separation along machine 10 between adjacent products. Such loss generally occurs during reverse thrusting of products 320. Such subsequent acceleration generally occurs as the entire carriage 80 is reverse reciprocated in the direction of arrow 370 back to its initial position adjacent to central side sealer section 60 (as illustrated in FIG. 1).

While the combination of heat and pressure from resistance wire 350 cooperates with retractable jacket 352 to provide an improved cross seal, the relative deceleration of package 320 from the former predetermined speed thereof urges such package back against seal bars 310 and 320 to ensure a tensionless seal. More particularly, as illustrated in present FIG. 5, an enlarged side view of the carriage section 480 of a packaging machine in accordance with the present invention illustrates the general path therethrough of products 420 in the direction of arrows 422. Precise movement of products 420 along such path include the above-mentioned relative deceleration and acceleration thereof, as described in greater detail below.

Referring to both FIGS. 5 and 6, a reciprocating carriage 410 is schematically represented, which carriage is reciprocatable in a longitudinal sense of a packaging machine, as illustrated by double-headed arrow 412. While precise details may vary with different applications, carriage 410 is preferably secured to moveable elements such as linear ball bearings 414 and 416, which in turn are slidably mounted for respective movement along the longitudinal axes of rods 418 and 424. Such rods are preferably associated with a relatively fixed structure, such as the frame of a packaging machine in accordance with the present invention. Of course, alternative arrangements other than linear ball bearings may be utilized to permit controlled longitudinal reciprocation of carriage 410.

Alternatively secured to either carriage 410 itself or one of the linear ball bearings upon which same is mounted (such as lower linear ball bearing 416) are elements for actuating the carriage reciprocation cycle. While numerous reciprocation actuation mechanisms may be practiced, FIG. 6 illustrates one preferred embodiment in which a pair of members 430 and 432 project downwardly from the lower portion of carriage 410 and/or the lower linear ball bearing 416 so as to establish therebetween a cam follower section. A single revolution clutch 434 may then be actuated for rotating cam 436 about the center of clutch 434. Cam 436 engages the inward cam follower surfaces of elements 430 and 432 so as to cause controlled reciprocation alternately in the directions of heads 412 as clutch 434 is rotated, as understood by one of ordinary skill in the art. Since carriage 410 comprises a substantially integral unit, cam follower elements 430 and 432 may be mounted on virtually any portion of such carriage, or on either of linear ball bearings 414 and 416 so as to controllably reciprocate the entire carriage.

Additionally, a micro-switch 440 includes an actuatable member 442 thereof, which may be selectively actuated by rotation of clutch 434, particularly by the radially enlarged segment 444 thereof. Such enlarged area may be selectively established during the production of clutch 434, and micro-switch 440 adjusted so as to output a signal therefrom, for use as further described hereinbelow with respect to operation of reciprocating carriage assembly 480.

Before describing in further detail the operation of reciprocating carriage assembly 480, it should also be noted (as generally indicated by double-headed arrow 450) that the distance between parallel bars 418 and 424 may be selectively varied, which in turn adjusts the overall machine for handling of different sized articles, and/or adjusts the compression applied to products within carriage assembly 480, such compression being applied at least until completion of the final cross seal for a given package.

FIG. 5 illustrates more particularly one exemplary embodiment of mechanisms which may be utilized in accordance with the present invention to reduce or eliminate tension in films which enclose products. In particular, a train of products 420 are fed in seriatim in the direction of arrow 422 into carriage assembly 480. Upon entering such assembly, the products are generally already joined in a continuous tube-type wrap (formed by action of a side seal section 60 of machine 10, as in FIG. 1), with some finite separation between the products along the longitudinal direction of the packaging machine.

A detecting device, such as a photocell mechanism 484 and 485 provides a detection or output signal on lines 486 thereof. Such signal is preferably indicative of a predetermined portion of a product stack 420 entering carriage assembly 480, and most preferably indicates detection of the trailing edge of a stack of products 420 (such as edge 421 of FIG. 5) entering carriage assembly 480. Upon such signal, single revolution clutch 434 (or an equivalent reciprocation actuation device) is powered for longitudinally reciprocating the carriage, first in the predetermined direction indicated by arrow 422, and subsequently in a longitudinal direction reverse thereto. At the same time, seal bars 460 and 462 are activated by their respective actuation members, schematically indicated as air cylinder devices 464 and 466, respectively (see also FIG. 4 and its related explanation). Such closing motion of seal bars 460 and 462 results in formation of cross seals 492, as explained above with reference to FIGS. 1 and 4.

As part of the tension reducing features of the present invention, the exemplary embodiment of present FIG. 5 utilizes various linkage elements to relatively decelerate products 420 within the reciprocating carriage beneath said former predetermined speed of such products (at which speed carriage assembly 480 is initially reciprocated in a forward direction along arrow 422), so as to relatively urge products 420 backwards against seal bars 460 and 462 as they close (see FIG. 4). Linkage member 470 is in this exemplary embodiment attached to one of the seal bars (here upper seal bar 460 at point 472 thereof) and a pivotable roller frame 490 at point 494 thereof. An upper pivotable roller frame 500 is suitably linked through a second linkage member 502 at pivoting contact points 504 and 506 thereof so that both pivotable roller frame members 500 and 490 are simultaneously actuated via linkage 470 by closure of the seal bars. Various alternative linkage schemes may be practiced so long as the effective operation thereof as further described hereinbelow generally results.

Roller frame members 490 and 500 respectively pivot about central support points 510 and 512 thereof. Each roller frame has its own respective roller on each end thereof. Furthermore, respective conveyor belt-type members 520 and 522 are supported for movement with carriage assembly 480. For example, conveyor belt 520 is entrained about larger rollers 530, 532, and 534, as illustrated. Between rollers 530 and 534, conveyor belt 520 passes around a series of smaller rollers, being diverted thereby from along a straight path between rollers 530 and 534 so as to pass around the respective end rollers of pivoting roller frame 490. Three interior rollers 536 (part of such smaller rollers) specifically correspond with similarly situated rollers 538 (associated with conveyor belt 522) positioned above products 420 so as to maintain products 420 under compression, as earlier established by the packaging machine and as discussed above (particularly with respect to FIG. 1).

Upper conveyor belt 522 is similarly entrained about three larger rollers 540, 542, and 544. It should be noted however that larger roller 540 is elevated above the top of products 420 emerging from carriage 480 so that a space 546 is established between conveyor belt 522 and the top side of finished packaged products 420, thereby releasing compression thereon for ease in subsequent handling of such finished package products. In general, the position of smaller roller 548 is established relative larger roller 540 so as to also provide space 546 for release of compression as the packaged products emerge from the opposing sets of interior smaller rollers 536 and 538. In general, the remaining smaller interior rollers 550 do not move vertically within carriage assembly 480 (except for adjustments related to arrow 450 as discussed above with reference to FIG. 6), and are not positionally affected by any pivoting of pivotable roller frame 490 and 500.

With respect to operation of such pivotable roller frames, the solid line positions thereof indicate an initial position assumed by the pivotable roller frames prior to reciprocation of carriage assembly 480, and concurrent closure of seal bars 460 and 462 therewith. Once a detection signal is provided on line 486 indicative of the trailing edge of a stack of products 420 entering carriage assembly 480, clutch 434 is actuated so that the entire carriage begins to reciprocate initially in a forward direction 422 at the same predetermined speed with which products 420 entered carriage 480.

Substantially at the same time that such reciprocation begins, seal bars 460 and 462 begin to close. The attachment of linkage 470 at point 472 causes point 494 of pivotable roller frame 490 to be pushed downward, since linkage 470 is a rigid element. As the right hand end of pivotable roller frame 490 is pushed downward in the direction of arrow 560 so as to assume the dotted line position thereof indicated by reference character 490', the opposite end of roller frame 490 is pivoted clockwise about center point 510 thereof in the direction of arrow 562 so as to assume a position (not illustrated for purposes of clarity) in accordance with dotted line indication 490'. Such pivoting of roller frame 490 causes rigid linkage member 502 to pivot roller frame member 500 counterclockwise about center point 512 thereof, so that the right hand end of roller frame 500 is moved upward in the direction of arrow 564 until it assumes a dotted line position as illustrated at reference character 500'. In a manner analogous to the pivoting action of roller frame 490, the left hand end of roller frame 500 is simultaneously moved downward in the direction of arrow 566 to a new position thereof (not illustrated for purposes of clarity) in accordance with the dotted line illustration of 500'.

The net affect of the controlled pivoting of roller frames 490 and 500 responsive to reciprocation of carriage assembly 480, and more specifically responsive to closure of seal bars 460 and 462, is to cause a deceleration of products 420 within such assembly relative to the former predetermined speed thereof so that such products are urged relatively backwards towards seal bars 460 and 462 as same closes (as discussed with respect to FIG. 4). Respective conveyor belts 520 and 522 travel around end rollers 570 of the roller frames, and are pulled in a reverse direction upon initial pivoting of frames 490 and 500, thereby urging such products relatively backwards towards the closing seal bars.

During the initial forward and subsequent reverse reciprocation of carriage assembly 480, the length of time which the seal bars are closed is controlled by the physical structure of single revolution clutch 434, including radially enlarged portion 444 thereof. As illustrated in present FIG. 6, an approximate 60° dwell time is established by each side of the radially extended area 444, so that timing of the seal bar closure and subsequent opening is established over about 120° of clutch rotation to permit sufficient formation of cross seals 492 before jacket 352 (FIG. 4) releases its hold on the packaging films trapped therebetween and contact surface 364 of lower seal bar 320, and before compression is released on the completed package in space 546 of carriage 480 (FIG. 5). Once such sufficient time has passed, micro switch 440 is appropriately actuated to control respective hydraulic (or equivalent) driving members 464 and 466 to release closure of seal bars 460 and 462.

Upon opening of seal bars 460 and 462, linkages 470 and 502 again function in a manner similar to that as described above, but with reverse results. In other words, as seal bars 460 and 462 separate, the right hand end of rotatable roller frame 490 is pivoted counterclockwise about center point 510 thereof in the direction opposite to that of arrow 560 so as to return to the solid line position 490 as illustrated in FIG. 5. Likewise, the left hand end of roller frame 490 is simultaneously rotated about such center point 510 so as to also return to the solid line indicated position thereof, whereby rigid linkage member 502 causes a similar reverse pivoting action of roller frame 500 clockwise to move same from the dotted line indication thereof to the solid line representation of FIG. 5.

During such reverse rotation of frames 490 and 500, conveyor belts 520 and 522 (which continue to be entrained about end roller elements 570 of roller frames 490 and 500), cause acceleration of products 420 away from seal bars 460 and 462 at a speed generally greater than that of the former predetermined speed of such products, whereby the original longitudinal spacing between the train of products is re-established as if such products were at all times traveling at such predetermined speed thereof. In effect, such frame reverse rotation "ejects" the sealed products away from the seal bars to make up for the previous deceleration. Such return to substantially the original longitudinal product separation is thus an automatic and inherent feature of the operation of this exemplary embodiment in accordance with the present invention, and operated in accordance with the method disclosed therewith.

A further advantage automatically and inherently flowing from the structure and method of the present invention concerns the distance with which products 420 are relatively moved backwards due to deceleration thereof. Particularly, as discussed above, the distance between parallel support bars 418 and 424 of FIG. 6 may be varied (as illustrated by double-headed arrow 450) so as to adjust the amount of compression applied between smaller interior rollers 536 and 538 to products therebetween, or to simply adjust for different height products. Since as illustrated in FIG. 4 it is preferred that both seal bars move approximately equal amounts so as to meet in the relative center of products passed therebetween, it is important that such products be returned towards the seal bars a distance sufficient to cause an appropriate amount of the upper and lower films to be drawn into such center point for creating a cross sealing without any tension in the films.

Substantially by the inherent action of the foregoing structure operating in accordance with the present method, products 420 are automatically decelerated an amount in accordance with the degree to which the pivotable roller frame members are pivoted, which in turn depends upon the distance which the seal bars must move in order to go from their open to their closed position. Hence, the presently preferred embodiments of this invention essentially automatically ensure that adequate upper and lower film is appropriately manipulated (i.e. slackened, loosened or the like) in accordance with the present invention so as to form cross seals for the packages (even those packages under compression), without the formation of any tension in any such films, generally regardless of the package thickness.

Likewise, it is readily apparent to those of ordinary skill in the art based upon the present figures and the full and enabling description thereof that practice of the present invention will advantageously permit packaging of even relatively heavy or relatively high products, with similar superior results in achieving tensionless seals, even under compression.

To briefly summarize the method at least with which one may obtain high speed cross seals, even while high or heavy products are manipulated under compression, the following brief general review is provided. While products are being encased in film, upper and lower continuous webs of such film are formed into essentially a tube around the products, by using a side seal operation described above. Once such film and product configuration is established, a cross seal may be readily achieved with a cross seal unit mounted on a carriage assembly which preferably reciprocates during the cross seal function.

Promotion of a tensionless film around the product being packaged is furthered by relatively decelerating the product as it moves with the reciprocating carriage, which carriage initially moves forward at approximately the same predetermined speed with which the products formerly moved. Thus, the products are urged relatively backwards towards the seal bars or jaws as such bars close, to provide the necessary tension-removing effect on the films being cross sealed.

Another way of understanding the present invention is that a sufficient space is created for tensionless cross seals between adjacent products as they are longitudinally spaced upon entering the machine. Subsequent handling of the spaced products within a machine, preferably including operation of a reciprocating carriage in accordance with the present invention, then temporarily utilizes a portion of such separation to relatively decelerate products (i.e. close the gap between one set of products being finally packaged and the next subsequent set of products) so as to permit loosening of film material around the trailing edge of the package which otherwise would be drawn tight and placed under tension by closure of seal bars thereon. Obviously, such tension is disadvantageous in that accidents or rips can occur therewith, and the amount of tension would vary considerably with different thickness or weight products, and the like. As the completed package continues to be discharged from such reciprocating carriage, it is returned to its original longitudinal separation relative to adjacent packages by being subjected to acceleration up to a speed above the former predetermined speed thereof.

Numerous advantages flow from practice of the present invention. For example, by relatively shrinking the initial tube tightly in the side seal section of the apparatus, the product or stack of products are prevented from shifting so that error free packaging takes place.

Another important result of practice of some embodiments of this invention is that products may be continuously forwarded through the machine without requiring any stop/start operation, even at high rates of production speed up to 200 units per minute. Furthermore, products may optionally be subjected to compression throughout the important cycles of the packaging machine so that a compressed and enclosed product results. Of course, as understood from the foregoing, it is not essential that a machine in accordance with the present invention include compression as a feature thereof, the tensionless cross seal features of the present invention forming a broader aspect thereof. Thus, even at high speeds and even for heavy products, the cross seal mechanism (preferably including the vertically-disposable bars disclosed herein) accomplish sealing without tearing the film or even without producing substantially any tension therein.

Figure 7:
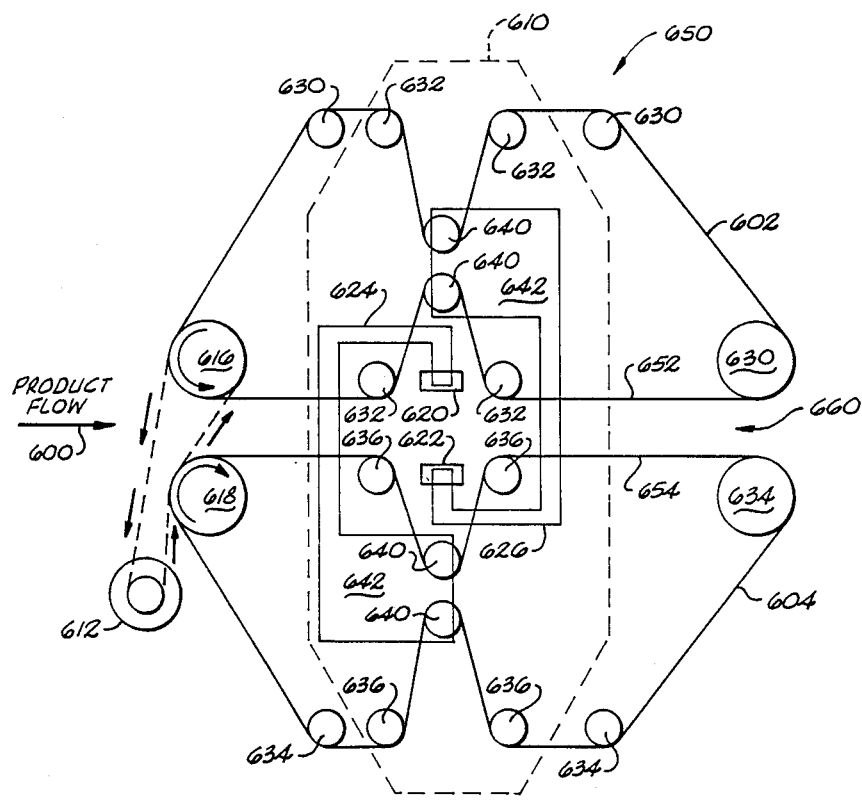
FIG. 7 illustrates an alternative embodiment of a reciprocatable carriage including film tension reducing means.

FIG. 7 illustrates an alternative film tension reducing means embodiment which may be practiced in place of the pivoting roller frame members of present FIG. 5. In general, the support, reciprocatable movement, and actuation of the FIG. 7 embodiment may be accomplished in accordance with features of the present invention more particularly referred to above with reference to FIGS. 5 and 6.

In FIG. 7, arrow 600 designates the flow of products through the embodiment thereof, which is generally left to right. The second conveyor means of FIG. 5 is again represented by an upper conveyor belt 602 and a lower conveyor belt 604. As illustrated, each of such conveyor belts is entrained about a plurality of roller members, some of which may be suitably mounted on the apparatus frame work itself, and others of which may be supported on an optionally included reciprocatable carriage 610 (represented in dotted line as is the representation 410 thereof in present FIG. 5). An essentially schematic representation of a drive mechanism 612 and arrows illustrated along the drive belt 614 thereof indicate the desired rotational direction of roller members 616 and 618, which are respectively associated with upper conveyor 602 and lower conveyor 604. Thus, when drive mechanism 612 is in operation, products are forwarded through the embodiment of FIG. 7 in the direction of arrow 600 thereof.

As illustrated, FIG. 7 includes an upper seal bar 620 and lower seal bar 622, which are analogous to the seal bars of present FIGS. 4 and 5. Such bars may be actuated for closure in any desired manner generally in accordance with the present invention, as described above. Support structure means 624 and 626 are generally associated with the upper and lower seal bars, respectively. While the schematic illustration of FIG. 7 is substantially set forth as a cross sectional view, the support structure means 624 and 626 thereof are instead illustrated more in perspective. In other words, such support structures preferably are associated with the ends of seal bars 620 and 622 so that products may pass freely through the embodiment of FIG. 7 when the seal bars are open. Each support structure means further includes roller means thereon, about which the respective conveyor belts are entrained for being manipulated in accordance with the present invention as further discussed below.

With respect to upper conveyor belt 602, additional roller members 630 may be mounted on the overall structure of a packaging machine in accordance with the present invention, while additional rollers 632 thereof may optionally be mounted on a reciprocating carriage 610 (when used) for movement therewith (as described above with reference to FIGS. 5 and 6). Likewise, lower conveyor belt 604 is entrained about additional roller elements 634 mounted on the frame work of the packaging machine, while additional rollers 636 about which such conveyor is entrained are supported on the optional reciprocatable carriage 610.

Roller means 640 of each of the support structure means 624 and 626 are rotatably mounted on projecting arm portions 642 of each such support structure means. For clarity in illustration, FIG. 7 shows seal bars 620 and 622 (and their associated support structure means) in an open position thereof. Also, reciprocatable carriage 610 is at an initial or rest position. Once a timing sequence or product detection desireably actuates operation of the cross seal area 650, the seal bars 620 and 622 will begin to mutually close, generally as described above with reference to other embodiments of the present invention. As is apparent from the illustration of FIG. 7, as such seal bars close together, the respective support structure means thereof cause the roller elements 640 to be vertically moved outward away from the closing seal bars. Hence, the respective conveyor belts are drawn inwardly towards the seal bars.

Particularly with respect to portion 652 of upper conveyor 602 and portion 654 of lower conveyor 604, products engaged between such portions are drawn against the designated forward direction of products within cross seal area 650 (defined by product flow arrow 600) back against seal bars 620 and 622 as same are closed. Such operation is substantially in accordance with that described above with reference to FIGS. 4–6, and hence need not be further discussed again in detail. Accordingly, the support structure means illustrated with reference to present FIG. 7 provides an alternative embodiment for reducing film tension in accordance with the present invention as cross seals are formed in packages around a product.

The embodiment of present FIG. 7 generally offers several particular advantages. For example, an essentially smoother action for the tensionless cross seals is obtained, whether or not reciprocation is used with carriage 610. Furthermore, the formation of packages under compression of relative indeterminate length is facilitated with the embodiment of FIG. 7. Additionally, such compression may be maintained completely out to exit area 660, without danger of tearing the wrapping films.

Of course, in analogous manner to the present FIG. 5 embodiment, opening of closed seal bars 620 and 622 causes the portions 652 and 654 of lower and upper conveyor belts 622 and 604, respectively, to be directed forward in the direction of arrow 600 for ejecting enclosed packages away from the cross seal area. As the seal bars open, roller means 640 are relatively moved in a vertical plane towards one another, with the outermost roller members thereof pulling inwardly on the respective conveyor belts to thereby move the packaged products forward. Various reciprocation and actuation mechanisms may be practiced, in the manner discussed above with reference to FIGS. 4–6.

Various modifications and variations of the present invention may be practiced by those of ordinary skill in the art without departing from the scope and spirit of the present invention. For example, a timing sequence for cross seal and/or reciprocation operation based on the predetermined speed of the products flowing through the machine and the longitudinal separation therebetween can be utilized in place of actual detection of products entering the cross seal area.

Likewise, various reciprocation actuation means other than a single revolution clutch and associated cam follower may be equivalently practiced for forward and reverse reciprocation of the carriage assembly. Similarly, pneumatic or air cylinders may be used with virtually equal application in place of hydraulic cylinders or the like for closing and permitting subsequent opening or actuation of opening for seal bars or equivalent cross seal structures. Furthermore in accordance with broader aspects of the present invention, even without reciprocation of a carriage assembly to permit overall continuous operation (i.e. non-stop feed in of products to the packaging machine), a start/stop-type operation could be assumed and the product actually (instead of relatively) urged backwards towards a cross seal mechanism just passed so as to remove tension on films being cross sealed therearound.

Not only does the reciprocation of the carriage assembly in accordance with the present invention permit the advantage of running at higher production rates (in combination with other appropriate features of the present invention), but by avoiding the necessity of a start/stop operation it simplifies the requisite control of the various driving mechanisms in the machine since continuous driving in "one direction" is all that is required from many of such elements. Thus, various alternative features of the present invention provide different types of advantages, while at least either relative or actual urging of the product being packaged towards the cross seal mechanism during the cross seal operation is an important feature with respect to provision of a tensionless cross seal.

As further variations, hermetic seals may be provided, generally whenever hot air is used as a supplement to a seal bar type arrangement. Otherwise, even without an actual or full hermetic seal, the enclosed products (especially those having been produced with compression) will remain slightly compressed for at least several minutes after emerging from the machine, thereby providing sufficient time for boxing, stacking, crating, etc. of same.

As an example of further variations which may be practiced, the lower seal bar (instead of the upper seal bar) may be provided with a hot wire and retractable jacket, while the upper seal bar (instead of the lower seal bar) is provided with a relatively flat contact surface for reception of the hot wire and jacket. Further reversal of parts or functions may be practiced. For example, the physical linkage between the seal bars and the pivotable roller frames may connect to the lower seal bar instead of the upper seal bar.

Alternatively, instead of using mechanical actuations efficiently established with rigid links therebetween, various control systems with particular timing sequences thereof may be used to open and close the seal bars and separately pivot the pivotable roller frames in accordance with the established sequence. Similarly, a controlled actuator element may be utilized in place of a spring for extending and subsequently partly retracting the jacket around the seal bar supporting the hot wire element thereof.

Certain features and aspects of the present invention are understood by those of ordinary skill in the art without complete detailed illustrations thereof. For example, with reference to FIG. 4, since seal bars 310 and 320 (as described in the specification and further understood from the complete context thereof) extend the width of the machine, it is apparent that in practice there exists a pair of upper air cylinders of the like 312 and a pair of lower air cylinders 322 or the like with one of the pair disposed on each end of the respective seal bars, even though only a single such air or hydraulic cylinder for each seal bar is illustrated in the side view of FIG. 4.

Likewise, a full description of the various axes of rotation for the many rollers utilized in the present invention, such as for FIG. 5, is not needed in detail for an understanding of the present invention. Of course, different numbers of belts and/or rollers may be practiced, so long as the important features and aspects of the present invention as described herein are provided.

The amount of compression which may optionally be practiced with the present invention varies largely dependent upon the characteristics of the products to be packaged themselves. For example, the separation between parallel support bars 418 and 424 of FIG. 6 may generally be controllably and continuously varied between approximately 0 to 3 inches. Typically, one desires to compress a product by about 10%, whenever compression is desired to be practiced. However, much higher percentages of compression may be practiced with the expectation that where non-hermetic seals will be used, the resulting packaged product will eventually expand up to some predetermined approximate percentage of its original thickness.

Furthermore, with some products such as towels, it is desired that the products be only initially compressed for purposes of packing and boxing (i.e. packing of the packaged products for shipment, storage, etc.), and then permitted to expand during the marketing phase thereof. Hence, completely hermetic seals would not be desirable in some instances, and thus the side sealer mechanisms generally illustrated by FIGS. 1 and 3a are sufficient without the optional hot air feature illustrated in present FIG. 2 (generally more often used where hermetic seal is desired).

Lastly, it is pointed out, as generally recognized by one of ordinary skill in the art without further specific disclosure, that the numerous drive rolls and the like, the single revolution clutch of the present invention, and other mechanisms thereof which require power inputs for rotatably driving same, may all comprise various controllable speed electric motors and the like (or their equivalents), essentially driven by one or more related control means or a microprocessor-type device so that the resulting function fully and enabling described above results.

In those instances where variable speed electric motors are driven by a centralized control mechanism, the over-all production rate of the resulting packaging machine may be adjusted by simply varying the speed of the electrical drives, with the inherent linkage actuations of the presently preferred embodiments in general automatically adjusting the reciprocating and seal bar closure timings. As discussed above, even such inherent timing features of the present invention may be varied to some extent. For example, the radially extending lobe of the single revolution clutch or the position of the micro-switch associated therewith may be varied so as to adjust the point in time of the cycle of rotation of the single revolution clutch that the seal bars release (i.e. open). In general, it is desired that the seal bars begin opening after the cross seal is sufficiently formed, but such opening can begin even before the reciprocating carriage assembly begins its reverse motion phase.

All modifications envisioned by those of ordinary skill in the art are intended to come within the scope and spirit of the present invention. The present description is intended as words of description only with respect to exemplary presently preferred embodiments, and not words of limitation, which are found only in the appended claims.

What is claimed is:

1. An apparatus for packaging articles in relatively tensionless plastic films, comprising:

first conveyor means for advancing longitudinally spaced-apart articles, to be separately packaged, in a defined forward direction at a predetermined speed;

upper and lower plastic film supply means for feeding film respectively above and below such articles so that as they are advanced the articles become sandwiched between such films;

article detection means, disposed relative to said first conveyor means, for outputting a detection signal responsive to the passage of articles thereby;

carriage means, disposed downstream of said first conveyor means and having second conveyor means generally for continuing advancement of said articles in said forward direction, sealing means responsive to said detection signal for laterally sealing said upper and lower films between adjacent articles being separately packaged; and film tension reducing means, responsive to said detection signal for urging articles within said carriage means relatively against said forward direction of said articles back towards said sealing means during its operation, thereby removing tension on said upper and lower films as same are sealed about such articles.

2. An apparatus as in claim 1, wherein:

said carriage means is reciprocatable responsive to said detection signal for advancing in said forward direction at said predetermined speed from an initial position and then returning to said initial position;

said sealing means is carried on said carriage means for advancing movement therewith at said predetermined speed; and said film tension reducing means is carried on said carriage means for movement therewith, and operates responsive to said detection signal so as to decelerate the forward speed of articles within said carriage means relative to said predetermined speed during advancing of said carriage means so that such articles are urged towards said sealing means during its operation, thereby producing seals in said upper and lower films without tension therein and generally without interrupting the forward flow of articles through said apparatus.

3. An apparatus as in claim 1, wherein said first conveyor means controllably maintains articles advanced thereby generally under a predetermined amount of compression.

4. An apparatus as in claim 3, wherein said second conveyor means controllably maintains articles advanced thereby under a generally predetermined amount of compression at least until completion of said sealing function for a respective article by said sealing means.

5. An apparatus as in claim 4, wherein both said first and second conveyor means include a plurality of respective upper and lower roller guides with endless belts trained therearound, with the distance between the respective upper and lower roller guides being variable so as to control the amount of compression provided to articles advanced thereby.

6. An apparatus as in claim 1, further comprising means for longitudinally trimming and sealing the marginal sides of opposing upper and lower plastic films projecting laterally outward beyond articles advanced by said first conveyor means.

7. An apparatus as in claim 6, further comprising removal means for removing excess film material trimmed by said means for longitudinally trimming and sealing.

8. An apparatus as in claim 6, wherein said means for longitudinally trimming and sealing include side seal conveyor means mounted in parallel with at least a portion of said first conveyor means laterally outward therefrom so as to grasp and guide the side marginal edges of said upper and lower films.

9. An apparatus as in claim 8, wherein said means for longitudinally trimming and sealing further includes a heated knife element mounted laterally between said first conveyor means and said side-seal conveyor means for engaging, trimming, and sealing plastic film passed thereby and held tautly by said first conveyor means and said side-seal conveyor means.

10. An apparatus as in claim 8, wherein said means for longitudinally trimming and sealing further includes a hot wire element held under tension and mounted laterally between said first conveyor means and said side-seal conveyor means for engaging, trimming, and sealing plastic film passed thereby and held tautly by said first conveyor means and said side-seal conveyor means.

11. An apparatus as in claim 7, wherein:

said means for longitudinally trimming and sealing further includes hot air means for blowing hot air onto the side seals downstream from said removal means; and said removal means includes an evacuation means for evacuating trimmed excess film.

12. An apparatus as in claim 1, wherein said sealing means includes upper and lower seal bars extending laterally generally the width of said carriage means and having mutually opposing contact faces, each of said seal bars being movable vertically responsive to said detection signal for coming together so as to seal said upper and lower films.

13. An apparatus as in claim 12, wherein one of said seal bars carries thereon a retracting jacket extending beyond the respective seal bar contact face, which jacket initially engages said films as said seal bars are brought together and before seal bar contact is made, whereby all tension is removed from said films as same are sealed.

14. An apparatus as in claim 13, wherein said one seal bar carrying said jacket further carries a hot wire mounted laterally along said contact face thereof, and the other of said seal bars includes a silicon rubber pad mounted laterally along its contact face, with a relatively thin teflon fiberglass tape thereover, said tape and said pad initially receiving said jacket as said seal bars are brought together, and then receiving said hot wire for laterally sealing said film.

15. An apparatus as in claim 12, wherein said film tension reducing means includes:
a pair of upper and lower pivotable roller frames with said second conveyor means comprising a plurality of endless belts entrained around such frames; and
linkage between said sealing means and said roller frames so that as said seal bars close together for laterally sealing said films, said roller frames are pivoted so as to cause an article carried on said carriage means to be relatively forced backwards in the opposite direction from said forward direction, and towards said sealing means, so as to thereby draw sufficient film around such article for being laterally sealed by said sealing means without any tension in such films.

16. An apparatus as in claim 15, wherein:
said carriage means is reciprocatably mounted on vertical ball bearings slidably received on a pair of rods carried by said apparatus, the distance between which rods may be varied for controlling an amount of compression exerted by said second conveyor means on articles carried within said carriage means; and further wherein
said apparatus further includes a crank arm and cam follower mechanism with a single revolution clutch for alternately advancing and returning said carriage means in a reciprocating movement responsive to said detection signal, said cam follower further including an adjustable split cam and cooperating micro-switch for being actuated thereby during a selected interval of carriage means movement for releasing closure from one another of said upper and lower seal bars of said lateral sealing means.

17. An apparatus as in claim 16, wherein said pivotable roller frames are reverse pivoted by said linkage to said sealing means as closure of said seal bars are released by said cam micro-switch, which reverse pivoting causes the laterally sealed article to be accelerated in a forward direction at a speed greater than said predetermined speed so as to regain its original longitudinal position relative to the other articles being packaged by said apparatus, whereby the apparatus can continuously seal articles at relatively high speeds without any start-/stop of article advancement within the entire apparatus and without any tension in the sealed films.

18. An apparatus as in claim 12, wherein said film tension reducing means includes support structure means associated with said seal bars for controlled vertical movement therewith, each of said support structure means supporting roller means thereon, and said second conveyor means comprising a plurality of endless belts at least partially entrained about such roller means, whereby closure of said seal bars results in movement of said support structure means and roller means thereof for drawing a portion of said second conveyor means and articles engaged thereby back towards said sealing means so that sufficient film is drawn around such articles for being laterally sealed by said sealing means without any tension in such film.

19. A machine for packaging compressed products in plastic film without inducing tension in the film of the finished package, said machine comprising:
upper and lower compression belts for advancing a train of products at a given speed and under compression;
upper and lower continuous webs of plastic film fed relative to said belts so that the products are sandwiched therebetween;
means for determining the position of advancing products;
a carriage, disposed longitudinally movable relative to said belts, for reciprocating, first in an advancing and then a reversing direction, responsive to indication of the trailing edge of an advancing product entering said carriage;
a pair of generally opposing seal bars, disposed on said carriage and downstream from said product detection means, for controllably closing and forming cross-seals in said films between adjacent products; and
pivoting roller frames, mounted on said carriage and controllably pivoting during said reciprocating thereof so as to cause products within said carriage and still held under compression by said roller frames to be pushed relatively back towards said seal bars during their closing, whereby tensionless seals are formed for products packaged under compression.

20. A machine as in claim 19, wherein said position determining means includes detection means mounted on said machine adjacent to the entrance of said carriage thereof.

21. A machine as in claim 19, further comprising a respective pair of side sealing devices on either lateral side of said upper and lower compression belts, for trimming excess plastic film material located marginally outside the products being packaged, and for side sealing such plastic films, wherein said side sealing elements at least in part utilize heat for trimming and sealing said films.

22. A machine as in claim 19, wherein said upper and lower seal bars mutually close to approximately the mid-point of the trailing side edge of the product being packaged, with both said bars comprising elongated members disposed laterally approximately the width of said carriage, and with said one of said seal bars defining a lower seal bar having an upper silicon rubber pad covered by a relatively thin teflon fiberglass tape on a contact surface thereof, and the other of said seal bars defining an upper seal bar having a lower contact surface including thereon a lateral hot wire arrangement for laterally sealing the products while a shroud-like jacket retractably surrounds same.

23. A machine as in claim 19, wherein said carriage further includes a single revolution clutch mechanism with crank arm and cam follower responsive to said trailing edge indication for reciprocating said carriage, and further including linkage means between said seal bars and said pivoting roller frames for pivoting said roller frames so as to push products back towards said seal bars as said seal bars close.

24. A machine as in claim 23, wherein said single revolution clutch mechanism further includes a split cam portion rotatable with said cam mechanism, and adjustable for striking a micro-switch mounted adjacent thereto, said micro-switch releasing said seal bars from their closed position, which release through said linkage means also automatically reverse pivots said roller frames so as to cause sealed products within said carriage to be accelerated away from said seal bars at a speed greater than said given speed so as to make up for their being pushed back towards said seal bar, whereby high speed, continuous packaging of products with tensionless seals may be accomplished.

25. A machine as in claim 19, wherein said pivoting roller frames maintain the products under compression at least until a time period after completion of the sealing function of said sealing bars sufficient for cooling of said cross-seals prior to release of the compression.

26. A machine for packaging under compression and in tensionless plastic film even relatively heavy or thick products, said machine comprising:
  upper and lower compression conveyors for cooperatively transporting a train of products under compression in a defined forward direction at a predetermined speed;
  respective upper and lower plastic film feed rolls for supplying continuous webs of film which enclose the respective tops and bottoms of products transported by said compression conveyors;
  a pair of side sealer means, disposed along at least a portion of respective sides of said compression conveyors, for sealing the sides of said webs of film as they oppose one another outside side edges of said products;
  reciprocating carriage means, including pivotable roller frames with endless belts entrained therearound, for receiving side-sealed products being discharged from said compression conveyors and maintaining such products under compression while longitudinally controllably reciprocating relative to said compression conveyors;
  product detection means for outputting a detection signal responsive to the trailing edge of advancing products entering said carriage means;
  cross-sealer means, mounted on said carriage means for movement therewith, responsive to said detection signal for closing together the respective upper and lower film webs about the product being packaged, and laterally sealing same along a direction perpendicular to said side seals thereof; and
  actuation means, mounted on said carriage means for movement therewith, responsive to said closing of said cross-sealer means for pivoting said roller frames so that the forward edges thereof are moved towards each other while the trailing edges thereof are moved away from each other, whereby normally advancing side-sealed products are drawn back against said cross-sealer means by said belts entrained around said frames, so as to remove tension from said film webs being closed and sealed about said products by operation of said cross-sealer means.

27. A machine as in claim 26, wherein:
said side sealer means include respective heated elements disposed between said compression conveyors and respective side-sealer belts which grasp the outer marginal portions of said films, which outer marginal portions are trimmed away by said heating elements, said side sealer means further including evacuation means for removing such trimmed-away outer marginal film portions; and wherein
said cross-sealer means includes upper and lower seal bars disposed laterally across the width of said carriage means and in opposing vertical channels for movement to and from one another, with said lower seal bar including heat-resistant pad members on a contact surface thereof, and said upper seal bar including a heated element on a contact surface thereof for being mated with said heat-resistant contact surface of said lower seal bar, and said upper seal bar further includes a retractable jacket element for protectively surrounding said upper seal bar heating element and contacting and holding said films to be cross-sealed prior to sealing thereof with said seal bars.

28. A machine as in claim 26, wherein:
said cross-sealer means includes respective upper and lower seal bar elements which vertically move in and out of contact for performing said closing and sealing function thereof; and
said actuation means includes a first linkage element connecting one of said seal bars with at least one of said pivotable roller frames for pivoting same responsive to controlled movement of said seal bars, and said actuation means further includes at least a second linkage element for interconnecting said roller frames with one another such that both roller frames are pivoted in tandem by movement of said first linkage element responsive to operation of said seal bars.

29. A machine as in claim 26, wherein:
said reciprocating carriage means are mounted on vertical ball bearings received on a pair of support bars, the distance between such members being variable so as to adjust the amount of compression applied to products within said carriage, supported on said machine;
said product detection means includes photodetector elements disposed relative to said carriage means and said compression conveyors for sensing products carried by said compression conveyors as they enter said carriage means; and
said cross-sealer means are actuated by a pair of upper and lower air cylinders, respectively.

30. A machine as in claim 27, wherein said reciprocating carriage means includes a crank arm and cam follower mechanism for reciprocating said carriage means beginning with receipt of said detection signal.

31. A machine as in claim 30, wherein said cam follower mechanism further includes an adjustable split cam and corresponding micro-switch mechanism associated therewith, said adjustable split cam having a predetermined camming surface for actuating said micro switch over a particular arcuate area of the revolution of the said adjustable split cam mechanism, such actuation causing the release and separation of said seal bars after they have closed and laterally sealed.

32. A method for packaging articles in relatively tensionless plastic films, comprising the steps of:
  advancing a plurality of spaced-apart articles, to be separately packaged, in a defined forward direction at a predetermined speed;
  feeding plastic films respectively above and below the articles as they are advanced along such forward direction so that they become sandwiched between such films;

providing sealing means responsive to passage, of articles thereby for drawing together and laterally sealing the pair of respective films, between adjacent articles to be packaged; and during operation of said sealing means, urging such articles relatively against said forward direction thereof back towards said sealing means, whereby tension is removed in the pair of films as same are drawn together and sealed about the articles.

33. A method as in claim 32, further including:

providing a carriage which is longitudinally reciprocatable relative the advancing articles;

detecting the passage of articles as they enter said carriage;

reciprocating said carriage responsive to such detecting of articles;

carrying said sealing means on said carriage means for movement therewith at said predetermined speed; and wherein said urging step includes, during reciprocating of said articles, decelerating the forward speed of articles within said carriage relative to said predetermined speed, so that such articles are urged relatively back towards said sealing means.

34. A method as in claim 33, wherein:

said reciprocating includes first advancing the carriage in the defined forward direction at the predetermined speed from the initial position thereof, and then returning the carriage to said initial position; and said sealing means is advanced during the advancing movement of the reciprocating carriage at the predetermined speed while the articles being packaged are advanced at a decelerated speed from the predetermined speed, whereby such articles are relatively directed towards the sealing means so as to remove tension in the upper and lower films.

35. A method as in claim 33, further comprising the step of maintaining compression on said articles to be packaged during said advancing and reciprocating steps, whereby the resulting package and tensionless plastic films enclose products compressed in at least one dimension from their original measurements.

36. A method as in claim 33, further comprising the step of trimming and sealing the marginal sides of the plastic films during said advancing step of a given article and before said reciprocating step therefor, such that said sealing of the pair of films between adjacent articles results in a complete seal for such articles on all sides thereof.

37. A method as in claim 33, wherein said providing sealing means step further includes the step of providing a pair of upper and lower seal bars disposed for controllable vertical movement from and towards one another for respectively closing and opening said sealing means, with at least one of said seal bars including a retractable shroud covering for the marginal portion thereof, said shroud initially striking the other of said seal bars as said seal bars are closed, and then retracting to permit contact between such seal bars while holding the pair of films to be sealed without any tension along the line thereof to be sealed.

38. A method as in claim 33, further comprising the step of:

after completion of sealing with said sealing means, accelerating the forward speed of articles in the carriage relative to said predetermined speed therefor so that such articles re-capture lost distance caused by said deceleration thereof, whereby a continuous sealing sequence is made possible, generally without the need of any start/stop operation of said article advancing step.

39. A method as in claim 37, wherein said decelerating step includes the step of automatically decelerating such articles within the carriage an amount sufficient to urge same towards the sealing means a distance corresponding to the distance which said seal bars must close for contacting one another during sealing operation.

40. A method as in claim 37, further comprising the step of adjusting, in correspondence with said predetermined speed, the length of time said seal bars are held closed so that sufficient time passes for the lateral seal thereby formed to cool under the protection of such retracted jacket so that no tension is applied to such lateral seal during its formation.

41. A method for packaging compressed articles in plastic film without inducing tension in the film of the finished package, comprising the steps of:

providing upper and lower compression belts for advancing a train of products at a given speed and under compression;

providing upper and lower continuous webs of plastic film;

feeding said webs of film relative said belts so that said products are sandwiched therebetween;

providing a reciprocatable carriage disposed relatively downstream from said belts for receiving and handling said products therefrom substantially in series;

providing a product detection device disposed adjacent the entrance of said carriage;

reciprocating said carriage first in an advancing direction at said given speed and then in a reversing direction, beginning such reciprocating responsive to the detection of the trailing edge of an advancing product entering said carriage;

providing upper and lower seal bars disposed on said carriage for advancing movement therewith at said given speed, and disposed downstream from said product detection device;

closing said seal bars to draw together and form lateral cross-seals in said films between adjacent products, responsive to product detection by said device therefor;

providing pivotable frame members mounted on said carriage; and controllably pivoting such frame members during reciprocating of said carriage so as to cause products within said carriage to be relatively pushed back towards said seal bars as they close, whereby tensionless seals may be formed for products under compression, even for relatively high or heavy products.

42. A method as in claim 41, wherein said pivotable frame members comprise a pair of pivotable roller frames, respectively positioned above and below products within said carriage, and having endless belts entrained therearound for generally transporting products through said carriage under a controllable amount of compression.

43. A method as in claim 41, further comprising a step of providing side sealer elements in the vicinity of said belts and operative during said feeding step so as to provide side seals for the webs of film which sandwich products therebetween.

44. A method as in claim 41, wherein said providing upper and lower seal bars includes providing a retractable jacket for at least one of said seal bars, said jacket initially contacting the other of said seal bars during closing of same so as to hold said films between adjacent products in place without tension therein during formation of said lateral cross-seals by said seal bars; and said method further comprises the step of variably adjusting the length of time said seal bars remain closed with said retractable jacket in place in accordance with said given speed so as to provide sufficient time for cooling of said lateral cross-seals formed thereby without any tension thereon.

45. A method as in claim 44, further comprising the step of opening said seal bars after said sufficient time to permit the cooling of the lateral cross-seals formed thereby; and reverse pivoting said frame members during such seal bar opening thereby causing products within said carriage to be ejected therefrom at an accelerated speed above said given speed so as to re-gain the position they would have attained without having been pushed back towards said seal bars, whereby a continuous sequence packaging operation is achieved.

46. A method as in claim 41, wherein said products are automatically pushed back towards said seal bar a variable distance in accordance with the distance said seal bars must close around such products so as to laterally cross-seal same.

47. A method as in claim 45, wherein said continuous packaging operation permits operation at a given speed sufficient to separately package up to 200 separated articles per minute, with said given speed being controllable for selectively establishing a desired packaging rate therebeneath.

48. A method as in claim 42, further comprising the step of varying the distances between the respective upper and lower compression belts and the upper and lower pivotable roller frames so as to adjust the amount of compression applied to articles packaged by such method.

* * * * *

UNITED STATES PATENT AND TRADEMARK OFFICE
CERTIFICATE OF CORRECTION

PATENT NO. : 4,858,416

DATED : August 22, 1989

INVENTOR(S) : Alfred C. Monaghan

It is certified that error appears in the above-identified patent and that said Letters Patent is hereby corrected as shown below:

Change "622" to "602" in column 21, line 1.

Change "side seal" to "side-seal" in column 24, line 34.

Delete the hyphen from "start/-" in column 25, line 58.

Signed and Sealed this

Twelfth Day of June, 1990

Attest:

HARRY F. MANBECK, JR.

Attesting Officer        Commissioner of Patents and Trademarks